United States Patent [19]

Hoyt, Jr. et al.

[11] Patent Number: 4,523,077

[45] Date of Patent: Jun. 11, 1985

[54] ELECTRIC ARC WELDER THAT PROVIDES NON-STICKING ARC INITIATION AND THEREAFTER MAINTAINS THE ARC

[75] Inventors: Harold C. Hoyt, Jr., Spanish Lake, Mo.; Danilo C. Martinez, Clearwater, Fla.; Stanley M. Philipak, Overland, Mo.

[73] Assignee: Big Four Manufacturing Company, Inc., O'Fallon, Mo.

[21] Appl. No.: 505,097

[22] Filed: Jun. 16, 1983

[51] Int. Cl.³ .............................................. B23K 9/10
[52] U.S. Cl. ........................ 219/137 PS; 219/130.31; 219/130.4
[58] Field of Search ................ 219/130.51, 130.31, 219/130.32, 130.33, 130.1, 137 PS, 130.4

[56] References Cited

U.S. PATENT DOCUMENTS

| | | | |
|---|---|---|---|
| 2,458,658 | 1/1949 | Tyrner | 219/130.33 |
| 3,809,853 | 5/1974 | Manz | 219/137 PS |
| 4,201,906 | 5/1980 | Puschner | 219/130.33 |
| 4,409,465 | 10/1983 | Yamamoto et al. | 219/130.51 |

FOREIGN PATENT DOCUMENTS

| | | | |
|---|---|---|---|
| 1401677 | 6/1963 | France | 219/130.1 |
| 2376546 | 9/1978 | France | 219/130.1 |
| 52-71356 | 6/1977 | Japan | 219/130.51 |
| 837665 | 6/1981 | U.S.S.R. | 219/130.51 |

OTHER PUBLICATIONS

Form No. B4-PP-39 and Blueprint No. 80-810-7 of the Big Four Manufacturing Co., Inc., (1980).

*Primary Examiner*—Clifford C. Shaw
*Attorney, Agent, or Firm*—Rey Eilers

[57] ABSTRACT

An electric arc welder has a current-conducting means which can supply welding power to an arc along a first volt-ampere curve, has a second current-conducting means which can be paralleled with the first current-conducting means to supply welding power to that arc along a second and distinctly-different volt-ampere curve, has a voltage-sensing circuit which senses the arc voltage, and has a control circuit which automatically and virtually-instantaneously shifts the supplying of welding power from a point on the first volt-ampere curve to a point of essentially-equal potential on the second and distinctly-different volt-ampere curve when the voltage-sensing circuit senses that the arc voltage has fallen below a predetermined value. That control circuit will subsequently shift the supplying of welding power from a point on the second and distinctly-different volt-ampere curve to a point of essentially-equal potential on the first volt-ampere curve when the voltage-sensing circuit senses that the arc voltage has risen above that predetermined value. In this way, a welding wire or welding rod can be continually advanced toward a weld puddle in a work piece, and the welding power which is supplied along the second and distinctly-different volt-ampere curve will transfer the tip of that welding wire or welding rod to that weld puddle without "shorting" and thereby extinguishing the arc.

28 Claims, 3 Drawing Figures

ELECTRIC ARC WELDER THAT PROVIDES NON-STICKING ARC INITIATION AND THEREAFTER MAINTAINS THE ARC

BRIEF SUMMARY OF INVENTION

During, and subsequent to, the initiation of an arc, the electric arc welder of the present invention supplies welding power to that arc along a first predetermined volt-ampere curve as long as the arc voltage is at or above a predetermined value. That electric arc welder will supply welding power to that arc along a second and distinctly-different predetermined volt-ampere curve whenever the arc voltage falls below that predetermined value; and it will shift virtually-instantaneously from the supplying of welding power along the first predetermined volt-ampere curve to the supplying of welding current along the second and distinctly-different predetermined volt-ampere curve. Moreover, whenever the electric arc welder shifts from the supplying of welding power along the first predetermined volt-ampere curve to the supplying of welding current along the second and distinctly-different predetermined volt-ampere curve, it will shift between points of essentially-equal potential on those curves even though larger amounts of welding power can be supplied to the arc along the second and distinctly-different predetermined volt-ampere curve. It is, therefore, an object of the present invention to provide an electric arc welder which supplies welding power to an arc along a first predetermined volt-ampere curve as long as the arc voltage is at or above a predetermined value, which supplies welding power to that arc along a second and distinctly-different predetermined volt-ampere curve whenever the arc voltage falls below that predetermined value, and which shifts between points of essentially-equal potential on those curves even though larger amounts of welding power can be supplied to the arc along the second and distinctively-different predetermined volt-ampere curve.

The values of welding power, which can be supplied to an arc along the first predetermined volt-ampere curve, will be large enough to provide non-sticking initiation of the arc and to repeatedly initiate the formation of globules of hot metal at the tip of the welding wire or welding rod. The values of welding power which can be supplied to that arc along the second and distinctly-different predetermined volt-ampere curve will promptly transfer each globule of metal to the weld while continuing to maintain the arc. As a result, the electric arc welder of the present invention can provide non-sticking initiation of an arc, can repeatedly initiate the formation of globules of hot metal at the tip of the welding wire or welding rod, and can promptly transfer each globule of metal to the weld while continuing to maintain the arc. It is, therefore, an object of the present invention to provide an electric arc welder which provides values of welding power along a first predetermined volt-ampere curve to provide non-sticking initiation of an arc and to repeatedly initiate the formation of globules of hot metal at the tip of the welding wire or welding rod, and which then supplies values of welding power along a second and distinctly-different predetermined volt-ampere curve to promptly transfer each globule of metal to the weld while continuing to maintain the arc.

The globules of hot metal will be formed on the tip of the welding wire or welding rod as that welding wire or welding rod is being advanced toward the weld puddle on the work piece; and the arc will shorten as that tip is advanced toward that weld puddle. The arc voltage will decrease as that arc shortens; and, when that arc voltage falls below the predetermined value, the electric welder will shift virtually-instantaneously from the supplying of welding power along the first predetermined volt-ampere curve to the supplying of welding current along the second and distinctly-different predetermined volt-ampere curve. The consequent prompt transference of each globule of hot metal to the weld puddle will lengthen the arc; and, thereupon, the arc voltage will increase. When that arc voltage rises to the predetermined value, the electric arc welder will shift back from the supplying of welding power along the second and distinctly-different predetermined volt-ampere curve to the supplying of welding power along the first predetermined volt-ampere curve. Successive globules of hot metal will start to form while welding power is being supplied to the arc along the first predetermined volt-ampere curve; and those globules of hot metal will be successively transferred to the weld puddle while welding power is being supplied to the arc along the second and distinctly-different predetermined volt-ampere curve. It is, therefore, an object of the present invention to provide an electric arc welder which successively starts to form globules of hot metal while welding power is being supplied to the arc along the first predetermined volt-ampere curve, and which will successively transfer those globules of hot metal to the weld puddle while welding power is being supplied to the arc along the second and distinctly-different predetermined volt-ampere curve.

The voltage across an arc is a function of the length of that arc; and the length of an arc is an important factor in the maintaining of that arc. A voltage-sensing circuit, which has a closed loop that includes the arc, will monitor the arc voltage; and hence will monitor the length of the arc. If the length of the arc tends to become unduly short, the arc voltage will fall below the predetermined value; and the voltage-sensing circuit will sense that fall in voltage and will cause the electric arc welder to shift from the supplying of welding power along the first predetermined volt-ampere curve to the supplying of welding current along the second and distinctly-different predetermined volt-ampere curve. The resulting increased values of welding power will quickly halt the shortening of the arc, thereby maintaining the arc; and then those increased values of welding power will cause that arc to lengthen again. The consequent rise of the arc voltage to the predetermined value will be sensed by the voltage-sensing circuit; and, thereupon, the electric arc welder will shift from the supplying of welding power along the second and distinctly-different predetermined volt-ampere curve to the supplying of welding current along the first predetermined volt-ampere curve. It is, therefore, an object of the present invention to provide an electric arc welder which has a voltage-sensing circuit with a closed loop that includes the arc, which monitors the length of the arc by using the voltage-sensing circuit to monitor the arc voltage, which uses that voltage-sensing circuit to initiate a shift from the supplying of welding power along the first predetermined volt-ampere curve to the supplying of welding current along the second and distinctly-different predetermined volt-ampere curve whenever the arc voltage falls below that predetermined value, and which thereupon supplies increased values of welding power to halt the shortening of the arc.

The voltage-sensing circuit, of the electric arc welder provided by the present invention, can cause that electric arc welder to shift from the supplying of welding current along the first predetermined volt-ampere curve to the supplying of welding current along the second and distinctly-different predetermined volt-ampere curve in less than a microsecond. As a result, the transitional ohmic resistance, which the current-supplying means of the electric arc welder will exhibit during the shifting from the supplying of welding current along the first predetermined volt-ampere curve to the supplying of welding current along the second and distinctly-different predetermined volt-ampere curve, will be of short duration; and hence the resulting heating of that current-supplying means will be small. It is, therefore, an object of the present invention to provide an electric arc welder with a voltage-sensing circuit which can cause that electric arc welder to shift from the supplying of welding current along the first predetermined volt-ampere curve to the supplying of welding current along the second and distinctly-different predetermined volt-ampere curve in less than a microsecond.

The voltage-sensing circuit, of the electric arc welder of the present invention, can cause that arc electric welder to shift back from the supplying of welding current along the second and distinctly-different predetermined volt-ampere curve to the supplying of welding current along the first predetermined volt-ampere curve. As a result, that electric arc welder can, whenever the arc voltage rises to the predetermined value, again supply welding power to the arc along the first predetermined volt-ampere curve to initiate the forming of a further globule of hot metal. It is, therefore, an object of the present invention to provide an electric arc welder which can shift from the supplying of welding current along the first predetermined volt-ampere curve to the supplying of welding current along the second and distinctly-different predetermined volt-ampere curve, and can then shift back to the supplying of welding current along that first predetermined volt-ampere curve.

The electric arc welder provided by the present invention constitutes a demand system; because that electric arc welder will automatically provide an increase in welding power whenever the voltage-sensing circuit senses a shortening of the arc. However, it would be desirable to limit the maximum number of times per second that the electric arc welder can shift from the supplying of welding current along the first predetermined volt-ampere curve to the supplying of welding current along the second and distinctly-different predetermined volt-ampere curve, and vice versa. In doing so, that electric arc welder will minimize the amount of inductive energy which can be stored in the welding leads, and also will minimize the acoustical and electrical noise which can be developed during the forming of welds. It is, therefore, an object of the present invention to provide an electric arc welder which constitutes a demand system but which limits the maximum number of times per second that it can shift from the supplying of welding current along the first predetermined volt-ampere curve to the supplying of welding current along the second and distinctly-different predetermined volt-ampere curve, and vice versa.

Other and further objects and advantages of the present invention should become apparent from an examination of the drawing and accompanying description.

In the drawing and accompanying description, a preferred embodiment of the present invention is shown and described, but it should be understood that the drawing and accompanying description are for the purpose of illustration only and do not limit the invention and that the invention will be defined by the appended claims.

BRIEF DESCRIPTION OF PREFERRED EMBODIMENT

Figure 1:
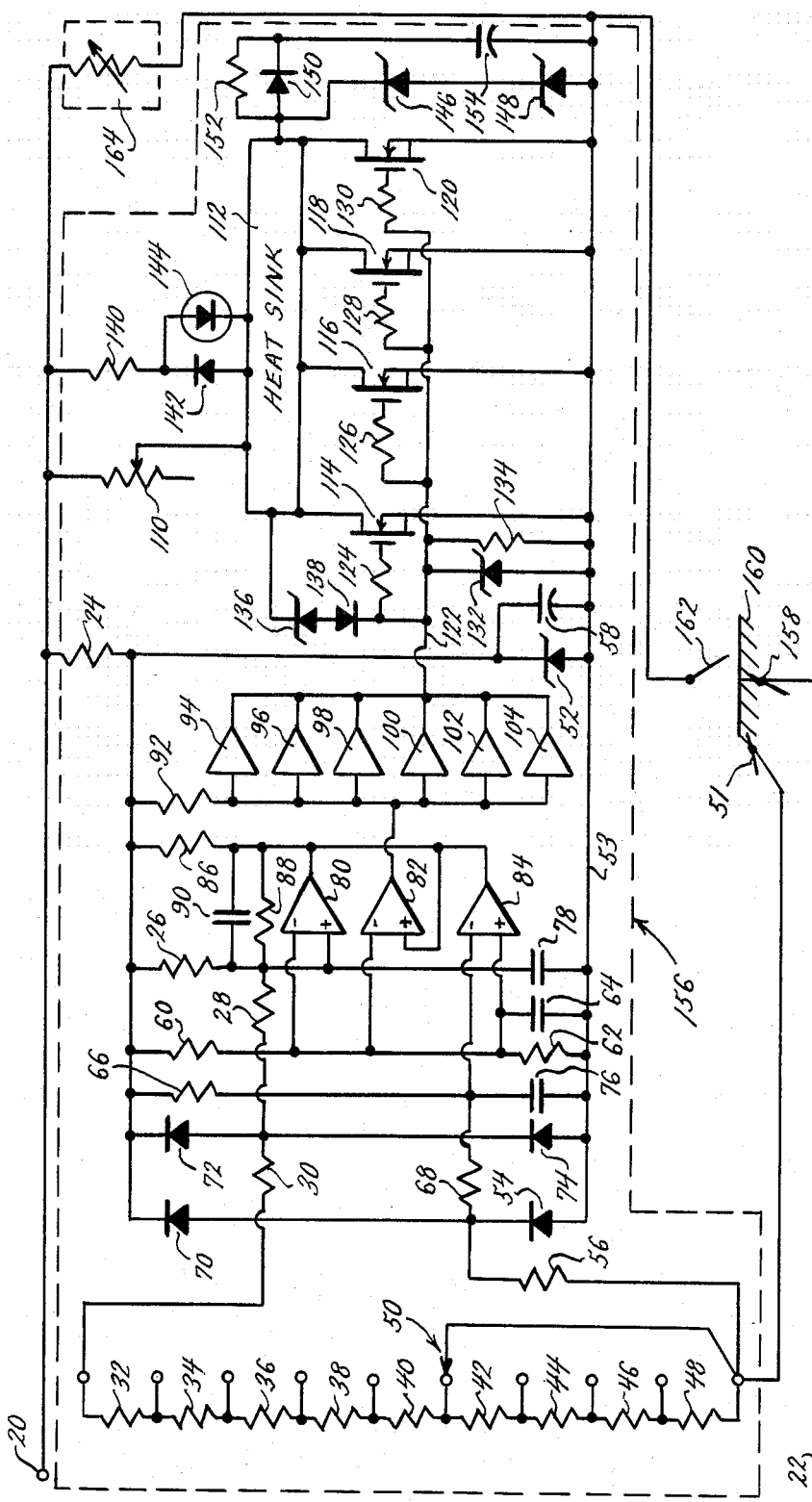
FIG. 1 is a schematic diagram of one preferred embodiment of electric arc welder that is made in accordance with the principles and teachings of the present invention.

Referring particularly to FIG. 1, the numeral 20 denotes a conductor which is connectable to the positive terminal of an essentially-constant voltage source of welding power. The numeral 22 denotes a conductor which is connectable to the negative terminal of that source of welding power. In the preferred embodiment of the present invention, the conductors 20 and 22 are connected to a welding power source of standard and usual design which supplies welding power at an essentially-constant voltage of eighty volts. Such a welding power source is commonly found in shipyards and in large plants where welding operations must be performed by many widely-separated areas.

A number of parallel paths are provided between the conductors 20 and 22; and one of those paths includes series-connected resistors 24, 26, 28, 30, 32, 34, 36, 38, 40, 42, 44, 46 and 48, alligator clip 51, a work piece 160, and an alligator clip 158. The last nine of those resistors are connected between the ten terminals of a multi-contact thumbwheel selector switch 50. In the preferred embodiment of the present invention, the uppermost terminal represents essentially six volts, the lowermost terminal represents essentially fifteen volts, and the intervening terminals represent one volt increments from essentially six volts to essentially fifteen volts.

A second path between conductors 20 and 22 includes the resistor 24, a Zener diode 52, a conductor 53, a diode 54, a resistor 56, alligator clip 51, work piece 160, and alligator clip 158. That Zener diode 52 will maintain a voltage of fifteen volts between the lower terminal of resistor 24 and conductor 53. A bypass capacitor 58 is connected in parallel with Zener diode 52.

Resistors 60 and 62 are connected in series with each other and in parallel with the Zener diode 52. The junctions between those resistors supply a reference voltage to the inverting inputs of comparator amplifiers 80 and 82 and to the non-inverting input of a comparator amplifier 84. Although various comparator amplifiers could be used, the preferred embodiment of the present invention uses the comparator amplifiers of an LM 339 N integrated circuit. Pins 6 and 8 of that integrated circuit are the inverting inputs of the comparator amplifiers 80 and 82, and pin 5 is the non-inverting input of comparator amplifier 84. Pin 7 of that integrated circuit is the non-inverting input of comparator amplifier 80; and it is connected to the junction between resistors 26 and 28. A capacitor 78 is connected between the lower terminal of resistor 26 and the conductor 53. Pin 4 of that intergrated circuit is the inverting input of comparator amplifier 84; and it is connected to a junction between a resistor 66 and a capacitor 76—which are connected in series between the lower terminal of resistor 24 and conductor 53. A resistor 68 connects pin 4 to the upper terminal of resistor 56.

A capacitor 64 is connected between the non-inverting input of comparator amplifier 84 and conductor 53. Pins 1 and 2 of the integrated circuit are the outputs of comparator amplifiers 80 and 84, and they are connected to the non-inverting input of comparator amplifier 82—which is pin 9 of the integrated circuit. Pin 14 of that integrated circuit is the output of comparator amplifier 82. Pin 3 of the integrated circuit is connected to the lower terminal of resistor 24; and the unused pins of the integrated circuit are connected to conductor 53.

A diode 70 is connected between the lower terminal of resistor 24 and the junction between resistors 56 and 68; and the diode 54 is connected between conductor 53 and the junction between those resistors. Those diodes constitute a protective subcircuit. A diode 72 is connected between the lower terminal of resistor 24 and the junction between resistors 28 and 30; and a diode 74 is connected between conductor 53 and the junction between those resistors. Those diodes also constitute a protective subcircuit. A resistor 86 is connected between the lower terminal of resistor 24 and pins 1, 2, and 9 of the integrated circuit. A resistor 88 and a capacitor 90 are connected in parallel between the output and the non-inverting input of comparator amplifier 80.

The numerals 94, 96, 98, 100, 102, and 104 denote six buffer amplifiers which are connected in parallel; and the inputs of those buffer amplifiers are connected to the output of comparator amplifier 82 and to the lower terminal of a resistor 92—which has the upper terminal thereof connected to the lower terminal of resistor 24. Although various buffer amplifiers could be used, the buffer amplifiers of a CD4050 integrated circuit are preferred.

A further path between the conductors 20 and 22 includes a tapped resistor 110, a heat sink conductor 112, the drain-source channels of four MOSFETs 114, 116, 118 and 120, conductor 53, welding electrode 162, work piece 160, and alligator clip 158. Although different MOSFETs could be used, IRF140 HEXFETs or SIEMENS SIPMOS BUZ-24 MOSFETs are preferred. Resistors 124, 126, 128 and 130 extend, respectively between the gates of the MOSFETs and a conductor 122, which is connected to the inter-connected output terminals of the buffer amplifiers 94, 96, 98, 100, 102 and 104. Those buffer amplifiers provide a low impedance input to the gates of those MOSFETs.

The pins 2, 4, 6, 10, 12, and 15 of the CD 4050 integrated circuit constitute the output terminals of the buffer amplifiers. The pins 3, 5, 7, 9, 11 and 14 of that integrated circuit constitute the input terminals of those buffer amplifiers. Pin 1 of that integrated circuit is connected to the lower terminal of resistor 24; and pin 8 of that integrated circuit is connected to conductor 53. The unused pins of that integrated circuit are permitted to float.

A Zener diode 132 and a resistor 134 are connected in parallel between conductor 122 and the sources of the MOSFETs 114, 116, 118 and 120 via conductor 53. That resistor and Zener diode will limit the voltage between the gates and sources of those MOSFETs. A Zener diode 136 and a diode 138 are connected in series between the heat sink conductor 112 and conductor 122; and that resistor and Zener diode will limit the voltage between the gates and drains of those MOSFETs.

A resistor 140 and an LED 144 are connected in series between conductor 20 and the heat sink conductor 112. An energy dissipating diode 142 is connected in parallel with that LED.

Zener diodes 146 and 148 are connected in series between the heat sink conductor 112 and conductor 53, and hence in parallel with the drain-source channels of the MOSFETs 114, 116, 118, and 120. A resistor 152 and a capacitor 154 are connected in series between heat sink conductor 112 and conductor 53; and a diode 150 is connected in parallel with that resistor.

The hereinbefore-identified circuit components constitute a volt-ampere control which is connected between conductors 20 and 22. That volt-ampere control is denoted by the numeral 156 of FIGS. 1 and 3.

A further path between the conductors 20 and 22 includes a grid ballast assembly 164, welding electrode 162, work piece 160, and alligator clip 158. Various grid ballast assemblies could be used as the grid ballast assembly 164; but one or more of the grid ballast assemblies manufactured and marketed by the Big Four Manufacturing Company, Inc., the assignee of the present invention, is preferred. One of those grid ballast assemblies is identified as a 577-245 SP Control Station, another is identified as a 577-295 SP Control Station, and still another is identified as a 577-395 SP Control Station. Each of those grid ballast assemblies has a number of low resistance, large capacity resistors therein which can be appropriately interconnected by a coarse selector switch that provides fifty ampere incremental changes in current and by a fine selector switch that provides five ampere incremental changes in current. The 577-395 SP Control Station can, when conductors 20 and 22 are connected across an eighty volt D.C. welding source, supply welding current from five amperes to three hundred and ninety-five amperes in five ampere increments into a minimal thirty volt arc.

Figure 2:
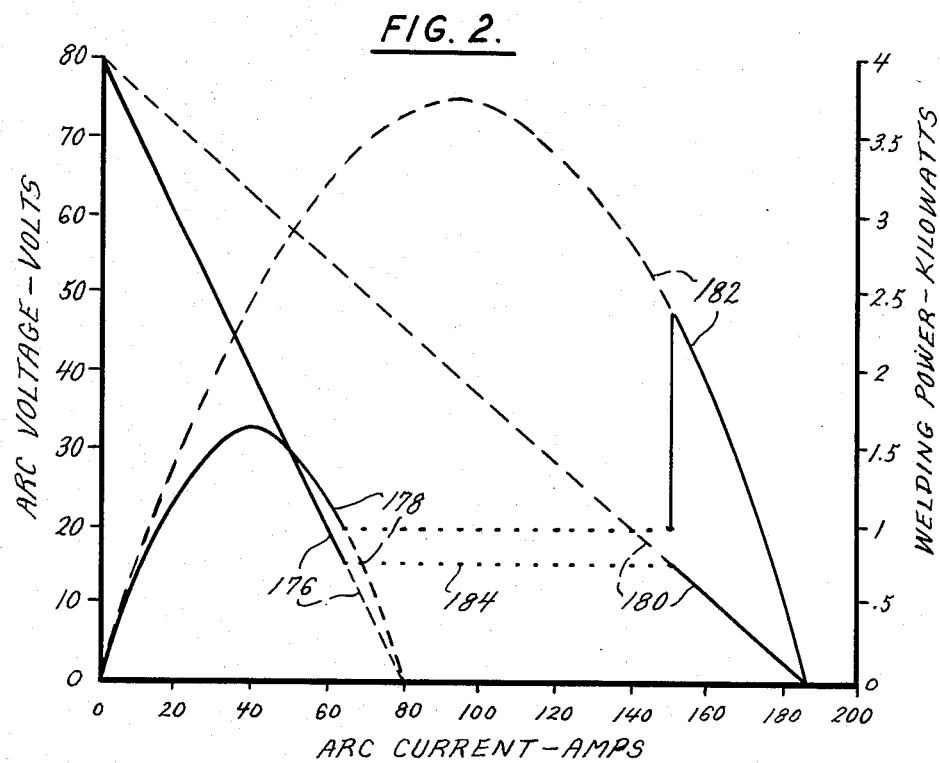
FIG. 2 is a graph which shows volt-ampere curves and welding power curves that can be provided by the electric arc welder of FIG. 1.

In planning to perform a weld with the electric arc welder of the present invention, the operator will check the metallic content, the thickness, the mass, the nature of the surface, and the other significant characteristics of the work piece 160. Thereafter, he will attach the alligator clips 51 and 158 to the work piece 160. He will then set the polarity-controlling switch of the grid ballast assembly 164, and also will set the coarse and fine selector switches of that grid ballast assembly to call for the supplying of the desired level of welding current; and the numeral 176 in FIG. 2 denotes a typical volt-ampere curve along which that grid ballast assembly can supply power to an arc. Also, that operator will set the thumbwheel switch 50 to a voltage level, from six to fifteen volts, which will be the lower voltage limit at which the electric arc welder can supply welding power along the curve 176. In FIG. 2, that voltage level can be seen to have been set at fifteen volts.

It will be noted that the curve 176 intersects the zero voltage, or short circuit, coordinate of the graph of FIG. 2 at about eighty amperes. The numeral 178 denotes a curve that represents the welding power which the electric arc welder can supply to an arc when that electric arc welder is supplying that welding power along the volt-ampere curve 176; and the peak of the curve 178 represents about sixteen hundred watts of welding power. Such an amount of welding power is sufficient, in many welding operations, to provide non-sticking arc initiation and also to maintain the arc if the arc length is not unduly shortened. However, if the tip of the welding wire or welding rod is advanced toward the weld puddle on the work piece 160 at a rate which is faster than the rate at which that tip can be melted and transferred to that weld puddle, the length of the arc may become unduly shortened—with consequent extinction of the arc. To keep the arc from becoming extinguished, the electric arc welder can supply welding power to that arc along a volt-ampere curve 180. That curve intersects the zero voltage, or short circuit, coordinate of the graph of FIG. 2 at about one hundred and eighty-five amperes. The numeral 182 denotes a curve that represents the welding power which the electric arc welder can supply to an arc when that electric arc welder is supplying that welding power along the volt-ampere curve 180; and the peak of the curve 182 represents about thirty-seven hundred and forty watts. The electric arc welder thus can supply more welding power to an arc when it is supplying welding power along the volt-ampere curve 180 than when it is supplying welding power along the volt-ampere curve 176.

As long as the arc voltage is at, or above, the fifteen volt level which FIG. 2 shows was set by the thumbwheel switch 50, the electric arc welder will supply welding power along the solid-line portion of the volt-ampere curve 176. However, when that arc voltage falls below fifteen volts, the electric arc welder will (a) stop supplying welding power to the arc along the solid-line portion of curve 176, (b) start supplying welding power to that arc along the solid-line portion of volt-ampere curve 180, and (c) shift from a point on the curve 176 to a point of essentially-equal potential on the curve 180. Thus, as shown by the constant voltage transition line 184 in FIG. 2, the shift from the curve 176 to the curve 180 is from a fifteen volt point on the former curve to a fifteen volt point on the latter curve. The constant voltage nature of the transition line 184 in FIG. 2 is due to the fact that the shift occurs in less than a microsecond.

The comparator amplifier 80 and the thumbwheel switch 50—with its resistors 32, 34, 36, 38, 40, 42, 44, 46 and 48—constitute parts of a voltage-sensing circuit; and they coact to supply an input reference signal to the non-inverting input of comparator amplifier 82. The comparator amplifier 80 also is responsive to the voltage across any arc between welding electrode 162 and the work piece 160; and, as long as an arc is established and its voltage is greater than the reference voltage, the comparator amplifier 80 will not supply a signal to the comparator amplifier 82 which will cause the latter comparator amplifier to apply a signal to the buffer amplifiers 94, 96, 98, 100, 102 and 104 which will enable those buffer amplifiers to render the MOSFETS 114, 116, 118 and 120 conductive. Consequently, as long as an arc is established and its voltage is greater than the reference voltage, all the welding current that is supplied to the arc will pass through the grid ballast assembly 164; and hence that welding current will follow the solid-line part of the curve 176. If the arc voltage falls below the reference voltage, the signal which the comparator amplifier 80 supplies to the comparator amplifier 82 will cause the latter comparator amplifier to render the buffer amplifiers 94, 96, 98, 100, 102 and 104 active, and will thereby cause the MOSFETs 114, 116, 118, and 120 to become conductive. Thereupon, part of the welding current will be supplied by the grid ballast assembly 164 and the rest of that welding current will be supplied by the tapped resistor 110 and the paralleled MOSFETs 114, 116, 118 and 120; and hence that welding current will follow the solid-line portion of the curve 180.

Prior to the time an arc is initiated between welding electrode 162 and work piece 160, the voltage across the gap between that welding electrode and that work piece, and also across the series-connected resistor 24, Zener diode 52, diode 54 and resistor 56, will be eighty volts. The absence of an arc will keep current from flowing through resistor 24, Zener diode 52, welding electrode 162 and work piece 160 to conductor 22; and the high resistance value of resistor 56 will keep sufficient current from flowing through Zener diode 52 to establish fifteen volts between the lower terminal of resistor 24 and conductor 53. As a result, the comparator amplifiers 80 and 82 and the buffer amplifiers 94, 96, 98, 100, 102 and 104 will be unable to render the MOSFETs 114, 116, 118 and 120 conductive.

When the welding electrode 162 has the tip thereof moved into engagement with the work piece 160 to initiate an arc, the resulting short circuit between that welding electrode and that work piece will enable the current flow through resistor 24, Zener diode 52, that welding electrode and that work piece to develop fifteen volts between the lower terminal of resistor 24 and conductor 53. The comparator amplifier 80 will sense that the voltage between welding electrode 162 and work piece 160 is less than the fifteen volt reference set by thumbwheel switch 50, and hence that comparator amplifier will cause comparator amplifier 82 and buffer amplifiers 94, 96, 98, 100, 102 and 104 to render the MOSFETs 114, 116, 118 and 120 conductive. Consequently, welding current will flow through tapped resistor 110 as well as through the grid ballast assembly 164 to initiate and maintain an arc.

In one embodiment of the electric arc welder of FIG. 1, the effective resistance of the grid ballast assembly 164 is only one ohm when that electric arc welder supplies welding current along the curve 176. The resistive value of the tapped resistor 110 is three-quarters of an ohm, and hence the combined resistance of tapped resistor 110 and of grid ballast assembly 164 is only forty-three hundredeths of an ohm. Consequently, the value of the welding current which is supplied along the curve 180 can exceed one hundred and eighty amperes. Such a value of current is amply large to provide non-sticking arc initiation and also to provide a deep penetrating weld. Once the arc has been initiated, the average voltage across that arc will be about seventeen to twenty volts; and hence the welding power will normally be supplied to the arc along the curve 176. However, oscilloscope patterns of the arc voltage show that negative-going spikes repeatedly extend downwardly from the average-level voltage trace; and those negative-going spikes extend well below the reference voltage set by the thumbwheel switch 50. As soon as any of those negative-going spikes extends below that reference voltage, the comparator amplifier 80 will sense that the arc voltage is less than the reference voltage; and, thereupon, that comparator amplifier will coact with comparator amplifier 82 and buffer amplifiers 94, 96, 98, 100, 102 and 104 to cause the MOSFETs 114, 116, 118 and 120 to become conductive. The action of the comparator amplifiers 80 and 82 and of the buffer amplifiers 94, 96, 98, 100, 102 and 104 in causing those MOSFETs to become conductive is very rapid—in less than a microsecond. As a result, the transitional changes of resistance in those MOSFETs is of very short duration.

Subsequently, as the arc voltage moves back up to the average voltage level, the comparator amplifier 80 will sense that the arc voltage is greater than the reference voltage; and, thereupon, that comparator amplifier will coact with comparator amplifier 82 and buffer amplifiers 94, 96, 98, 100, 102 and 104 to permit the MOSFETs 114, 116, 118 and 120 to become non-conductive. The comparator amplifiers 80 and 82 and the buffer amplifiers 94, 96, 98, 100, 102 and 104 are as rapid-acting in rendering the MOSFETs 114, 116, 118 and 120 non-conductive as they are in rendering those MOSFETs conductive; and hence the transitional changes of resistance in those MOSFETs is of very short duration when those MOSFETs are rendered non-conductive. As a result, those MOSFETs will not experience undue heating as they are rendered conductive or non-conductive.

The negative-going spikes that repeatedly extend downwardly from the average-level voltage trace can develop very rapidly as the globules of that metal closely approach the weld puddle in the work piece 160. In many instances, negative-going spikes in the order of twelve to fifteen volts can develop. Although the electric arc welder will shift from the supplying of welding power along the volt-ampere curve 176 to the supplying of welding power along the volt-ampere curve 180 as soon as a negative-going spike passes below the reference voltage, a short but finite amount of time will be needed for the additional welding power supplied along the curve 180 to lengthen the arc by transferring the globule of hot metal to the weld puddle. As a result, some negative-going spikes extend as much as eight to ten volts below the reference voltage. However, the additional welding power supplied along the curve 180 will transfer the globule of hot metal to the weld puddle, and will thereby lengthen the arc, before any globule of hot metal can cause a short-circuit and extinguish the arc. As a result, the additional welding power supplied along the curve 180 will promptly effect transfer of the globule of hot metal to the weld puddle before the arc could be extinguished, and thereby makes certain that the arc is maintained.

The LED 144 will be illuminated whenever the MOSFETs 114, 116, 118 and 120 are conductive, but it will be dark whenever those MOSFETs are non-conductive. That LED will be visible at the exterior of the electric arc welder; and, whenever it is illuminated, it will provide a visual indication to the operator of the fact that the electric welder is supplying current along the higher-magnitude volt-ampere curve 180. In performing a normal weld, the LED 144 will repeatedly be illumined and then permitted to be dark.

The capacitor 154 stores energy as the MOSFETs 114, 116, 118 and 120 are rendered non-conductive; and that energy is subsequently dissipated in resistor 152 as that capacitor discharges through that resistor and series-connected Zener diodes 146 and 148. The diode 150 acts to protect the MOSFETs by rapdily charging the capacitor 154 when those MOSFETs are rendered non-conductive.

The resistor 88 and the capacitor 90, which are connected between the output and the non-inverting input of comparator amplifier 80, provide positive feedback. A resulting hysteresis-like effect is provided which will enable that comparator amplifier to supply incisive and unmistakable signals to the non-inverting input of comparator amplifier 82. Consequently, whenever the arc voltage rises above the reference voltage, the comparator amplifier 80 will incisively and unmistakenly cause comparator amplifier 82 and the buffer amplifiers 94, 96, 98, 100, 102 and 104 to permit the MOSFETs 114, 116, 118 and 120 to become non-conductive. Also, whenever that arc voltage falls below that reference voltage, the comparator amplifier 80 will incisively and unmistakenly cause comparator amplifier 82 and the buffer amplifiers 94, 96, 98, 100, 102 and 104 to cause the MOSFETs 114, 116, 118 and 120 to become conductive.

The electric arc welder of the present invention constitutes a demand system; because that electric arc welder will automatically provide an increase in welding power whenever the voltage-sensing circuit senses a shortening of the arc. However, it would be desirable to limit the maximum number of times per second that the electric arc welder can shift from the supplying of welding current along the first predetermined volt-ampere curve to the supplying of welding current along the second and distinctly-different predetermined volt-ampere curve, and vice versa. The capacitor 78 and the series-connected resistors 26, 28, 30, and whichever of the resistors 32, 34, 36, 38, 40, 42, 44, 46 and 48 are rendered effective by the setting of the thumb wheel switch 50, will constitute an RC circuit which will limit the number of times per second that the comparator amplifier 80 can respond to rises and falls of the arc voltage above or below the reference voltage. That number of times should be just slightly larger than the average number of time the arc voltage will fall below the reference voltage. In the preferred embodiment of the present invention, that RC circuit keeps the electric arc welder from shifting from the solid-line portion of the curve 176 to the solid-line portion of the curve 180, and vice versa, oftener than two hundred times per second.

If desired, of course, the time constant provided by the RC circuit could be selected to permit more or fewer shifts per second from the solid-line portion of curve 176 to the solid-line portion of curve 180, and vice versa. However, by limiting the number of times per second that the shift can occur, the present invention limits the amount of inductive energy which can be stored in the welding leads; and thereby limits the acoustical and electrical noise which can be generated during welding operations. Also, it limits the transitional heating of the MOSFETs 114, 116, 118 and 120.

The comparator amplifier 84 is provided to supply an enabling signal to comparator amplifier 82 whenever the alligator clip 51 is connected to the work piece 160. That comparator amplifier will supply a disabling signal to comparator amplifier 82 whenever that alligator clip is not connected to that work piece. As a result, the comparator amplifier 84 functions as a switch that can make the volt-ampere control 156 active or can keep that volt-ampere control from being effective. If the alligator clip 51 is not connected to the work piece 160, the comparator amplifier 80 will be unable to sense an enabling voltage; and it will not be able to coact with comparator amplifier 82 and buffer amplifiers 94, 96, 98, 100, 102 and 104 to render the MOSFETs 114, 116, 118 and 120 conductive. As a result, all of the welding current will be supplied by the grid ballast assembly 164, and the LED 144 will remain dark. If the operator had intended to connect the alligator clip 51 to the work piece 160, the continued dark state of that LED will alert the operator to the fact that he failed to connect that alligator clip to that work piece. The capacitor 76 and the resistor 66 constitute an RC circuit which provides a subordinate time constant for the portion of the circuit which includes the comparator amplifier 84.

When the alligator clip 51 is not connected to the work piece 160, the electric arc welder will act as a standard grid ballast assembly; and hence it will be able to perform TIG, stick electrode and stud welding operations, and also will be able to perform air arc gauging, heat treating and stress relieving operations. When that alligator clip is connected to the work piece 160, the electric arc welder will be able to perform MIG, flux core, and stick electrode welding operations and will be able to perform air arc gauging operations. Moreover, when that alligator clip is connected to the work piece 160, the electric arc welder will be able to use aluminum or hard wire in performing MIG welding operations, and it will do a better job in performing stick welding and air arc gauging operations than when that alligator clip is not connected to the work piece 160. As a result, the electric arc welder provided by the present invention is extremely versatile and useful.

The comparator amplifier 82 can respond to the outputs of either of the comparator amplifiers 80 and 84. However, if the alligator clip 51 is not connected to the work piece 160, the comparator amplifier 84 will keep the comparator amplifier 82 from coacting with the buffer amplifiers 94, 96, 98, 100, 102 and 104 to render the MOSFETs 114, 116, 118 and 120 conductive—regardless of any response which the comparator amplifier 80 may make to the arc voltage and the reference voltage. If the alligator clip 51 is connected to the work piece 160, the comparator amplifier 82 will respond to signals from the comparator amplifier 80. The comparator amplifier 82 also is provided to supply the buffer amplifiers 94, 96, 98, 100, 102 and 104 with signals of the required polarity.

In the preceding description of the circuit of FIG. 1, it was assumed that the operator set the thumbwheel switch 50 to provide a reference voltage of fifteen volts. For work pieces that are sensitive to welding power, that thumbwheel switch will be set to provide a reference voltage of just six volts. For other work pieces, that thumbwheel switch can be set to provide a reference voltage of any desired value between six and fifteen volts.

Regardless of the reference voltage that is selected, the electric arc welder will supply welding current to the arc along the curve 176 as long as the arc voltage is at or above the reference voltage. Also, that electric arc welder will supply welding current to that arc along the curve 180 whenever that arc voltage is below that reference voltage.

Figure 3:
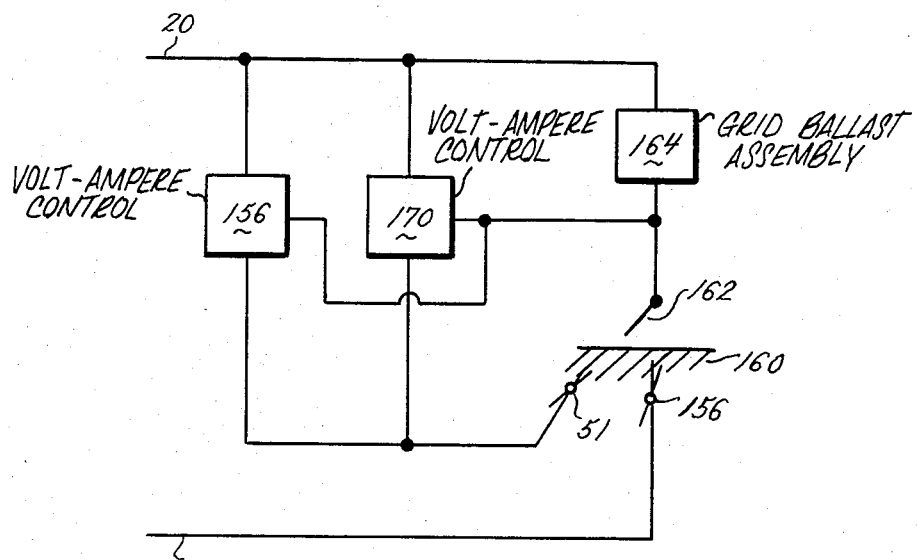
FIG. 3 is a block diagram of the electric arc welder of FIG. 1 after it has been equipped with a further volt-ampere control.

Referring particularly to FIG. 3, the numeral 170 denotes a further volt-ampere control which is connected in parallel with the volt-ampere control 156. That volt-ampere control preferably is identical, or very similar, to the volt-ampere control 156; and the junction between the resistors 48 and 56 in each of those volt-ampere controls is connectable to the workpiece 160 by the alligator clip 51. Also, the conductor 53 in each of those volt-ampere controls is connected to the welding electrode 162.

In using the electric arc welder of FIG. 3, the operator will set the thumbwheel switch of volt-ampere control 156 to provide a desired reference voltage and will set the thumbwheel switch of volt-ampere control 170 to provide a lower reference voltage. Where that is done, the tapped resistor 110 of volt-ampere control 156 will be connected in parallel with the grid ballast assembly 164 when the arc voltage falls below the reference voltage of that volt-ampere control. If the arc voltage then drops below the reference voltage of the volt-ampere control 170, the tapped resistor 110 of that volt-ampere control will be connected in parallel with the already-paralleled grid ballast assembly 164 and tapped resistor 110 of volt-ampere control 156. The resulting low effective resistance will permit the electric arc welder to supply very large values of welding current to the arc.

One or more additional volt-ampere controls can be connected in parallel with the volt-ampere controls 156 and 170. Inasmuch as the volt-ampere control 170 and any further volt-ampere controls will provide reference voltages which are smaller than the reference voltage provided by the volt-ampere control 156, the thumbwheel switch 50 of volt-ampere control 170 and of any further volt-ampere controls could be provided with fewer voltage settings. In fact, if desired, the thumbwheel switches of volt-ampere control 170 and of any further volt-ampere controls could be replaced with fixed resistors that would provide pre-set reference voltages for those volt-ampere controls.

The slope of the volt-ampere curve 180 is closer to the horizontal than is the slope of the volt-ampere curve 176. The slope of the volt-ampere curve of volt-ampere control 170 will be even closer to the horizontal; and the slope of the volt-ampere curves of any further volt-ampere controls will be progressively closer to the horizontal. As those slopes progressively approach the horizontal, the characteristic of the electric arc welder will closely approach the characteristic of a constant voltage electric arc welder. In actual practice, the oscilloscope patterns of the arc voltage, this is provided by the circuit of FIG. 1, shown that the arc voltage curve essentially resembles a horizontal line, except for the recurrent negative-going spikes. The oscilloscope patterns, of the arc voltage that is provided by the circuit of FIG. 3, also show that the arc voltage curve essentially resembles a horizontal line, except for the recurrent negative-going spikes. The essential difference between the arc voltage curves provided by the circuits of FIGS. 1 and 3 is that the greater available welding power afforded by the voltampere control 170 reduces the amplitude of the negative-going spikes or enables heavier welding wire to be used without any lengthening of those negative-going spikes.

The electric arc welder of FIG. 1 has proved itself capable of performing welds which other electric arc welders were unable to perform. Specifically, in one case, the electric arc welder of FIG. 1 provided ninety percent penetration of joints in three-eighths inch steel from just one side of those joints. Also, that electric arc welder was able to provide that weld penetration with wire that had a diameter of forty-five thousandths of an inch. Further, that electric arc welder was able to provide welds which were free of cold laps and which had good appearances although the surface of the steel had been covered with a thick paint coating that had been only partially removed. In addition, the operators stated that the electric arc welder gave them better weld puddle control.

The electric arc welder of the present invention is far superior to prior electric arc welders which were equipped with Hot Start circuits. Once a Hot Start circuit has performed its function of controlling the amount of current which can be supplied to initiate an arc, that Hot Start circuit will remain inactive until the arc is extinguished and is to be re-initiated, whereas the electric arc welder of the present invention can shift back and forth between its lesser-magnitude and its larger-amplitude volt-ampere curves many times per second. Also, circuits which are equipped with Hot Start circuits do not sense and respond to arc voltage; whereas the electric arc welder of the present invention directly senses, and directly responds to, arc voltage. Moroever, Hot Start circuits provide control at the signal level; whereas the electric arc welder of the present invention provides control at the welding power level.

The voltage-sensing circuit of the electric arc welder of the present invention directly senses and directly responds to the actual voltage across the arc rather than the voltage across the conductors 20 and 22. This is important; because it enables that electric arc welder to provide shifting between the volt-ampere curves 176 and 180 at the proper times, irrespective of changes in the voltage across those conductors.

In the electric arc welder of FIG. 1, the grid ballast assembly 164 is always connected between conductor 20 and the welding electrode 162, and the tapped resistor 110 is recurrently connected in parallel with that grid ballast assembly by the parallel-connected MOSFETs 114, 116, 118 and 120. Such an arrangement is desirable; because the resulting low-resistance connections between conductor 20 and grid ballast assembly 164 and between that grid ballast assembly and welding electrode 162 will produce minimal amounts of heat. However, if desired, four paralleled MOSFETs could be interposed between the grid ballast assembly 164 and the welding electrode 162, and the tapped resistor of three-quarters of an ohm resistance could be replaced by a tapped resistor of fortythree hundredths of an ohm. In such event, the MOSFETs in series with the grid ballast assembly 164 would normally be rendered conductive to enable that grid ballast assembly to supply all of the welding power, whenever the arc voltage was above the reference voltage set by the thumbwheel switch 50. The MOSFETs in series with the tapped resistor 110 would be rendered conductive, and the MOSFETs in series with the grid ballast assembly 164 would be rendered non-conductive, to enable that tapped resistor to supply all of the welding power whenever the arc voltage was below that reference voltage.

High speed photographs of the arc provided by the present invention show that globules of hot metal form on the tip of the welding wire or welding rod as that welding wire or welding rod is advanced toward the weld puddle on the work piece. As each of those globules of hot metal closely approaches that weld puddle, but while all, or substantially all, of that globule of hot metal is external of that weld puddle, that globule of hot metal is melted or otherwise transferred to that weld puddle. As a result, the formation of the globules of hot metal and the transference of those globules of hot metal into the weld puddle occur repeatedly and yet permit the arc to be maintained continuously.

The high speed photographs also shown that the transference of the globules of hot metal to the weld puddle does not occur at fixed intervals. Instead, the transference of those globules to that weld puddle occurs on a somewhat random basis—apparently being a function of variations in the nature or cross section along the length of the welding wire or welding rod, variations in the surface of the work piece, variations in the rate at which the welding wire or welding rod is fed, variations in the thickness of work piece, variations in power due to variations in the voltage across conductors 20 and 22, and possibly other variations which affect the rate at which the arc can heat the tip of the welding wire or welding rod. Importantly, those high speed photographs show that the globules of hot metal are promptly and fully transferred to the weld puddle while all, or substantially all, of the masses of those globules of hot metal are visibly external of that weld puddle; and hence the transferences occur without causing the arc to be extinguished. Moreover, those high speed photographs show that the method of welding which is provided by the present invention is not the same as any of the four standard methods of welding which are recognized by those skilled in the art. Specifically, the method of welding provided by the present invention is quite different from spray welding and from pulse welding. Moreover, although the method of welding provided by the present invention does form globules of hot metal, it differs from globular welding methods in that the completed weld does not have visible traces of globules. Instead, a typical puddle—type weld is produced by the method of welding provided by the present invention. Also, that method differs from the short circuit or dip welding method; because it transfers the metal from the tip of the welding wire or welding rod to the weld puddle while all, or substantially all, of that metal is external of that weld puddle, and also because it continuously maintains the arc. Not only is the method of welding provided by the present invention different from all prior recognized welding methods, but it produces more stable arcs and better welds.

In the preferred embodiment of the present invention, the various passive components have the following values:

| Component | Value |
| --- | --- |
| Resistor 24 | 1.5k ohm 10 watts |
| Resistor 26 | 75k ohm ¼ watt 5% |
| Resistor 28 | 33k ohm ¼ watt 5% |
| Resistor 30 | 100k ohm ¼ watt 5% |
| Resistor 32 | 10k ohm ¼ watt 5% |
| Resistor 34 | 10k ohm ¼ watt 5% |
| Resistor 36 | 10k ohm ¼ watt 5% |
| Resistor 38 | 10k ohm ¼ watt 5% |
| Resistor 40 | 10k ohm ¼ watt 5% |
| Resistor 42 | 10k ohm ¼ watt 5% |
| Resistor 44 | 10k ohm ¼ watt 5% |
| Resistor 46 | 10k ohm ¼ watt 5% |
| Resistor 48 | 10k ohm ¼ watt 5% |
| Zener Diode 52 | 15 volt Zener diode, 1 watt |
| Diode 54 | 1N4001 |
| Resistor 56 | 100k ohm ¼ watt 5% |
| Capacitor 58 | 10 microfarads, 25 volt working voltage |
| Resistor 60 | 47k ohm ¼ watt 5% |
| Resistor 62 | 47k ohm ¼ watt 5% |
| Capacitor 64 | 0.01 microfarad, 100 volt working voltage |
| Resistor 66 | 150k ohm ¼ watt 5% |

-continued

| Component | Value |
| --- | --- |
| Resistor 68 | 10k ohm ¼ watt 5% |
| Diode 70 | 1N4001 |
| Diode 72 | 1N4001 |
| Diode 74 | 1N4001 |
| Capacitor 76 | 1 microfarad, 100 volt working voltage |
| Capacitor 78 | 0.1 microfarad, 100 volt working voltage |
| Resistor 86 | 3.3k ohm ¼ watt 5% |
| Resistor 88 | 3.3 megohms ¼ watt 5% |
| Capacitor 90 | 0.01 microfarad, 100 volt working voltage |
| Resistor 92 | 10k ohm ¼ watt 5% |
| Tapped Resistor 110 | 1 ohm 2.5 kilowatts resistor tapped to provide ¾ ohm |
| Resistor 124 | 10 ohm ¼ watt 5% |
| Resistor 126 | 10 ohm ¼ watt 5% |
| Resistor 128 | 10 ohm ¼ watt 5% |
| Resistor 130 | 10 ohm ¼ watt 5% |
| Zener Diode 132 | 15 volt Zener diode, 1 watt |
| Resistor 134 | 1 megohm ¼ watt 5% |
| Zener Diode 136 | 91 volt MOSORB Zener diode, 1500 watts for one millisecond |
| Diode 138 | 1N4004 |
| Resistor 140 | 2.5k ohms 10 watts |
| Diode 142 | 1N4001 |
| Zener Diode 146 | 47 volt MOSORB Zener diode, 1500 watts for one millisecond |
| Zener Diode 148 | 47 volt MOSORB Zener diode, 1500 watts for one millisecond |
| Diode 150 | IN1201R |
| Resistor 152 | 200 ohms 55 watts |
| Capacitor 154 | 220 microfarads, 150 volt working voltage |

Whereas the drawing and accompanying description have shown and described a preferred embodiment of the present invention, it should be apparent to those skilled in the art that various changes may be made in the form of the invention without affecting the scope thereof.

What we claim is:

1. An electric arc welder that is connectable to a source of power and to a welding electrode and to a work piece and that comprises current-conducting means connectable to said source of power to maintain a continuous arc between said welding electrode and said work piece, while selectively supplying power to said arc along a first predetermined volt-ampere curve or along a second and distinctly-different predetermined volt-ampere curve, a sensing circuit which can sense the voltage across said arc and which develops a predetermined signal whenever said voltage across said arc falls below a predetermined value, and a control circuit that can coact with said sensing circuit to permit said current-conducting means to supply welding power to said arc along said first predetermined volt-ampere curve whenever said voltage across said arc is at or above said predetermined value, said control circuit responding to said predetermined signal from said sensing circuit to cause said current-conducting means to supply welding power to said arc along said second and distinctly-different predetermined volt-ampere curve whenever said voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, and said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential but very substantially larger current on said second and distinctly-different predetermined volt-ampere curve, said current-conducting means being dimensioned to supply power to said arc at levels which are great enough to do welding whenever said voltage across said arc is at or above said predetermined value and also to repeatedly supply greater values of current of momentary duration to said arc to continue to do welding whenever said voltage across said arc falls below said predetermined value during zero-going voltage spikes.

2. An electric arc welder as claimed in claim 1 wherein said control circuit causes said current-conducting means to shift back from the supplying of welding power along said second and distinctly-different predetermined volt-ampere curve to the supplying of welding power along said first predetermined volt-ampere curve so rapidly that the shift is from a point on said second and distinctly-different predetermined volt-ampere curve to a point of substantially equal potential but substantially smaller current on said first predetermined volt-ampere curve.

3. An electric arc welder as claimed in claim 1 wherein said current-conducting means includes a plurality of paralleled field effect transistors which are rendered conductive when said current-conducting means shifts from the supplying of welding power along said first predetermined volt-ampere curve to the supplying of welding power along said second and distinctly-different predetermined volt-ampere curve, and where in said current-conducting means includes a resistor of a ballast grid which can continuously supply current to said arc and also includes a second resistor and wherein said parallel field effect transistors selectively connect said second resistor in series with said arc while the first said resistor is supplying current to said arc.

4. An electric arc welder as claimed in claim 1 wherein an adjustable means can be adjusted to adjust said predetermined value of voltage which is sensed by said sensing circuit.

5. An electric arc welder as claimed in claim 1 wherein a grid ballast assembly is part of said current-conducting means and continuously supplies welding power to said arc whenever said current-conducting means is supplying welding power to said arc along said first predetermined volt-ampere curve, or along said second and distinctly-different predetermined volt-ampere curve.

6. An electric arc welder as claimed in claim 1 wherein said sensing circuit simultaneously senses said predetermined voltage value and said arc voltage.

7. An electric arc welder as claimed in claim 1 wherein welding wire is progressively advanced toward a welding puddle in said work piece, wherein said current-conducting means is dimensioned to supply sufficient welding power to said arc to initiate the formation of a globule of metal from said welding wire while said current-conducting means is supplying power to said arc along said first predetermined volt-ampere curve, and wherein said current-conducting means is dimensioned to supply a greater amount of power to said arc to transfer said globule of metal to said welding puddle while said current-conducting means is supplying welding power to said arc along said second and distinctly-different predetermined volt-ampere curve.

8. An electric arc welder that is connectable to a source of power and to a welding electrode and to a work piece and that comprises current-conducting means connectable to said source of power to maintain a continuous arc between said welding electrode and said work piece, while selectively supplying power to said arc along a first predetermined volt-ampere curve or along a second and distinctly-different predetermined volt-ampere curve, a sensing circuit which can sense the voltage across said arc and which develops a predetermined signal whenever said voltage across said arc falls below a predetermined value, and a control circuit that can coact with said sensing circuit to permit said current-conducting means to supply welding power to said arc along said first predetermined volt-ampere curve whenever said voltage across said arc is at or above said predetermined value, said control circuit responding to said predetermined signal from said sensing circuit to cause said current-conducting means to supply welding power to said arc along said second and distinctly-different predetermined volt-ampere curve whenever said voltage across said arc is below said predetermined value, said first predetermined volt-ampere curve having a corresponding power curve of a predetermined magnitude, said second and distinctly-different predetermined volt-ampere curve having a corresponding power curve of a greater predetermined magitude, whereby the amount of welding power which can be supplied to said arc is greater than said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential but very substantially larger current on said second and distinctly-different predetermined volt-ampere curve, said current-conducting means being dimensioned to supply power to said arc at levels which are great enough to do welding whenever said voltage across said arc is at or above said predetermined value and also to repeatedly supply greater values of current to said arc to continue to do welding whenever said voltage across said arc falls below said predetermined value during zero-going voltage spikes, said source power being a D.C. power soure which can simultaneously supply power to a plurality of electric arc welders, said power source supplying power to said current-conducting means at a substantially-constant voltage level, and said current-conducting means supplying power to said arc at a generally constant voltage level whenever said current-conducting means is supplying welding power to said arc along said first predetermined volt-ampere curve.

9. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric arc welder having a clip that is connectable to said work piece, said electric arc welder having a sensor which senses that said clip has been connected to said work piece, and said sensing circuit and said control circuit being unable to cause said current-conducting means to shift from the supplying of welding power along said first predetermined volt-ampere curve to the supplying of welding power along said second and distinctly-different predetermined volt-ampere curve unless said sensor senses that said clip has been connected to said work piece.

10. An electric arc welder that is connectable to a source of power and to a welding electrode and to a work piece and that comprises current-conducting means connectable to said source of power to maintain a continuous arc between said welding electrode and said work piece, while selectively supplying power to said arc along a first predetermined volt-ampere curve or along a second and distinctly-different predetermined volt-ampere curve, a sensing circuit which can sense the voltage across said arc and which develops a predetermined signal whenever said voltage across said arc falls below a predetermined value, and a control circuit that can coact with said sensing circuit to permit said current-conducting means to supply welding power to said arc along said first predetermined voltampere curve whenever said voltage across said arc is at or above said predetermined value, said control circuit responding to said predetermined signal from said sensing circuit to cause said current-conducting means to supply welding power to said arc along said second and distinctly-different predetermined volt-ampere curve whenever said voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential but very substantially larger current on said second and distinctly-different predetermined volt-ampere curve, said current-conducting means being dimensioned to supply power to said arc at levels which are great enough to do welding whenever said voltage across said arc is at or above said predetermined value and also to repeatedly supply greater values of current to said arc to continue to do welding whenever said voltage across said arc falls below said predetermined value during zero-going voltage spikes, said source of power being a D.C. power source which can simultaneously supply power to a plurality of electric arc welders, said D.C. power source supplying power to said current-conducting means at a substantially-constant voltage level, said current-conducting means including a first passive means that is connected in series with said arc whenever said current-conducting means is supplying power to said arc along said first predetermined volt-ampere curve, said current-conducting means including a second passive means that is connected in series with said arc whenever said current-conducting means is supplying power to said arc along said second and distinctly-different predetermined volt-ampere curve, said current-conducting means supplying power to said arc at a generally constant voltage level whenever said current-conducting means is supplying power to said arc along said first predetermined volt-ampere curve.

11. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing cicuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supply of welding power along said predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric welder having a clip that is connectable to said work piece, said electric arc welder having a sensor which senses that said clip has been connected to said work piece, and said current-conducting means supplying power to said arc only along said first predetermined volt-ampere curve whenever said clip is not connected to said work piece.

12. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric arc welder having a clip that is connectable to said work piece, said electric arc welder having a sensor which senses that said clip has been connected to said work piece, said current-conducting means responding to said sensing circuit to selectively supply power to said arc along said first predetermined volt-ampere curve or along said second and distinctly-different predetermined volt-ampere curve when said clip is attached to said work piece.

13. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric arc welder having a clip that is connectable to said work piece, said electric arc welder having a sensor which senses that said clip has been connected to said work piece, said current-conducting means supplying power to said arc only along said first predetermined volt-ampere curve whenever said clip is not connected to said work piece, and said current-conducting means responding to said sensing circuit to selectively supply power to said arc along said first predetermined volt-ampere curve or along said second and distinctly-different predetermined volt-ampere curve when the said clip is attached to said work piece.

14. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric arc welder having a clip that is connectable to said work piece, said electric arc welder having a sensor which senses that said clip has been connected to said work piece, said current-conducting means supplying power to said arc only along said first predetermined volt-ampere curve whenever said clip is not connected to said work piece, and said current-conducting means providing essentially constant current welding whenever said clip is not connected to said work piece.

15. An electric arc welder that is connectable to a source of power and to a welding electrode and to a work piece and that comprises current-conducting means which can respond to said source of power to supply welding power to an arc, between said welding electrode and said work piece, along a first predetermined volt-ampere curve or along a second and distinctly-different predetermined volt-ampere curve, a sensing circuit which can sense the voltage across said arc, a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential on said second and distinctly-different predetermined volt-ampere curve, said electric arc welder having a clip that is connectable to said work piece, said electric arc welder having a sensor which senses that said clip has been connected to said work piece, said current-conducting means responding to said sensing circuit to selectively supply power to said arc along said first predetermined volt-ampere curve or along said second and distinctly-different predetermined volt-ampere curve when said clip is attached to said work piece, and said current-conducting means providing essentially constant voltage welding during at least part of the time when said clip is attached to said work piece.

16. An electric arc welder that is connectable to a source of power and to a welding electrode and to a work piece and that comprises current-conducting means connectable to said source of power to continuously maintain an arc between said welding electrode and said work piece while selectively supplying power to said arc along a first predetermined volt-ampere curve or along a second and distinctly-different predetermined volt-ampere curve, a sensing circuit which can sense the voltage across said arc, and a control circuit that can respond to said sensing circuit to cause said current-conducting means to supply welding power to said arc along said first predetermined volt-ampere curve whenever the voltage across said arc is at or above a predetermined value, said control circuit responding to said sensing circuit to cause said current-conducting means to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, said current-conducting means including a grid ballast assembly connectable in series relation with said arc to supply welding power along said first predetermined volt-ampere curve, and said current-conducting means also including a resistor which said control circuit can connect in series-relation with said arc and in parallel with said grid ballast assembly to supply welding power along said second and distinctly-different predetermined volt-ampere curve; said grid ballast assembly being dimensioned to supply sufficient welding power to said arc to do stick welding, and said resistor being dimensioned to coact with said grid ballast assembly to supply sufficient welding power to said arc to do MIG welding.

17. An electric arc welder that is connectable to a source of D.C. power which can simultaneously supply D.C. power to a plurality of electric arc welders to enable said electric arc welders to supply welding power to a plurality of welding electrodes and to a plurality of work pieces and that comprises current-conducting means which includes a first resistor that is connectable in series relation with an electrode and a work piece and said source of D.C. power to supply welding power to an arc between said welding electrode and said work piece along a first predetermined volt-ampere curve, said current-conducting means also including a second resistor that is connectable in series relation with said electrode and work piece and said source of D.C. power while said first resistor is connected in series relation with said electrode and work piece and said source of D.C. power to supply welding power to said arc along a second and distinctly-different predetermined volt-ampere curve, a sensing circuit which can sense the voltage across said arc, and a control circuit than can respond to said sensing circuit to cause said first resistor of said current-conducting means to supply welding power to said arc along said first predetermined volt-ampere curve whenever the voltage across said arc is at or above a predetermined value, said control circuit responding to said sensing circuit to cause said first and said second resistors of said current-conducting means to coact to supply welding power to said arc along said second and distinctly-different predetermined volt-ampere curve whenever the voltage across said arc is below said predetermined value, said first predetermined volt-ampere curve having a corresponding power curve of a predetermined magnitude, said second and distinctly-different predetermined volt-ampere curve having a corresponding power curve to a greater predetermined magnitude, whereby the amount of welding power which can be supplied to said arc is greater when said current-conducting means is supplying welding power to said arc along said second and distinctly-different predetermined volt-ampere curve than when said current-conducting means is supplying welding power to said arc along said first predetermined volt-ampere curve, and said sensing circuit and said control circuit being adapted to cause said current-conducting means to shift from the supplying of welding power along said first predetermined volt-ampere curve to the supplying of welding power along said second and distinctly-different predetermined volt-ampere curve, and vice versa, a multiple number of times per second, said current-conducting means supplying D.C. power to said arc at a generally constant voltage level whenever said current-conducting means is supplying power to said arc along said first predetermined voltampere curve, said current-conducting means supplying D.C. power to said arc as momentary zero-going spikes whenever said current-conducting means is supplying power to said arc along said second and distinctly-different predetermined volt-ampere curve.

18. An electric arc welder as claimed in claim 17 wherein a subcircuit means limits the number of times per second to a number which slightly exceeds the average number of shifts from the supplying of welding power along said first predetermined volt-ampere curve to the supplying of welding power along said second and distinctly-different predetermined volt-ampere curve.

19. An electric arc welder that is connectable to a source of D.C. power and to a welding electrode and to a work piece and that comprises current-conducting means which can respond to said source of D.C. power to supply welding power, up to a predetermined magnitude of welding power, to an arc whenever the voltage across said arc is at or above a predetermined value, said current-conducting means being adapted to respond to said source of D.C. power to supply welding power, up to a greater predetermined magnitude of welding power, to said arc whenever the voltage across said arc is below said predetermined value, said current-conducting means including a first resistor that is connectable in series with said arc and said source of D.C. power and also including a second resistor that is selectively connectable in series with said arc and said source of D.C. power, said first resistor supplying a value of current to said arc that is controlled by the combined resistances of said first resistor and of said arc whenever said voltage across said arc is at or above said predetermined value, said second resistor coacting with said first resistor to supply a value of current to said arc which is controlled by the combined resistances of said second and first resistors plus the resistance of said arc whenever said voltage across said arc is below said predetermined value, and sensing and control means that sense the value of the voltage across said arc and keep said second resistor from supplying current to said arc whenever said arc voltage is at or above a predetermined level but causing said second resistor to coact with said first resistor to supply a large value of current to said arc whenever said arc voltage is below said predetermined level, said current-conducting means being adapted, whenever said voltage across said arc is at or above said predetermined value to supply D.C. power to said arc along a voltage curve which is essentially constant but which has many spikes therein which fall below said predetermined value but stop short of short circuit level, and said current-conducting means, whenever any of said spikes falls below said predetermined value, supplying welding power to said arc which has a magnitude greater than said predetermined magnitude although at relatively-low voltage.

20. An electric arc welder as claimed in claim 19 wherein said first resistor and said second resistor coact to supply welding power to said arc, which has a magnitude greater than said predetermined magnitude, and thereby melt the welding metal rapidly enough to keep said spikes from reaching the short circuit level.

21. An electric arc welder as claimed in claim 19 wherein a further current-conducting means and the first said current-conducting means can simultaneously respond to said source of D.C. power to supply welding power, up to a still greater predetermined magnitude of welding power, to said arc, wherein said further current-conducting means has a third resistor that is connectable in series with said arc and said source of D.C. power, said third resistor coacting with said first and second resistors to supply a value of current to said arc that is controlled by the combined resistances of said first and second and third resistors plus the resistance of said arc whenever said first said current-conducting means and said further current-conducting means are supplying welding power to said arc, said further current-conducting means being able to coact with said first said current-conducting means to supply welding power to said arc only when said voltage across said arc is below a second and lower predetermined level, said further current-conducting means coacting with said first said current-conducting means supplying welding power, up to said still greater predetermined magnitude of welding power, to said arc whenever said voltage across said arc is below said second and lower predetermined value.

22. An electric arc welder that is connectable to a source of D.C. power and to a welding electrode and to a work piece and that comprises a passive currentconducting means which supplies all of the welding power to an arc whenever said electric arc welder is supplying welding power to said arc when the arc voltage is at or above a predetermined value, a second passive current-conducting means which supplies at least some of the welding power to an arc whenever said electric arc welder is supplying welding power to said arc when said arc voltage is below said predetermined value, and a sensing circuit which senses said arc voltage and causes the first said passive current-conducting means to supply all of said welding current to said arc whenever said arc voltage is at or above said predetermined value, said sensing circuit causing said second passive current-conducting means to supply at least some of said welding current to said arc whenever said arc voltage is below said predetermined value, said first said passive current-conducting means being selectively connectable in series with said arc and said source of D.C. power to supply welding power to said arc, said second passive current-conducting means being selectively connectable in series with said arc and said source of D.C. power but in essentially-parallel relation with said first said passive current-conducting means while said first said passive current-conducting means is connected in series with said arc and said source of D.C. power to supply welding power to said arc, said first said passive current-conducting means providing a generally constant arc voltage whenever said first said passive current-conducting means is supplying all of said welding power to said arc, but also providing zero-going voltage spikes in response to decreases in the resistance of said arc, said sensing circuit responding to zero-going voltage spikes which pass below said predetermined value to cause said second passive current-conducting means to coact with said first said passive current-conducting means to supply welding power to said arc, said first said passive current-conducting means and said second passive current-conducting means coacting to supply substantial amounts of welding power to said arc at voltages below said predetermined value when said second passive current-conducting means supplies any of said welding power to said arc.

23. A method of continuously maintaining an electric welding arc while melting and transferring welding metal to a weld puddle on a work piece at low voltage levels a multiple number of times per second which comprises connecting a resistor in series with said arc and a source of D.C. welding power to supply welding power to said arc along a predetermined volt-ampere curve as long as the arc voltage is at or above a predetermined value to heat the tip of a welding electrode, sensing when said arc voltage falls below said predetermined value, and connecting a second resistor in series with said arc and said source of D.C. welding power so both of said resistors simultaneously supply welding power to said arc to supply welding power to said arc along a second, and greater-magnitude predetermined volt-ampere curve to promptly transfer the metal of the tip of said welding electrode to the weld puddle while the arc voltage is below said predetermined value and to immediately thereafter permit said arc voltage to rise above said predetermined value.

24. The method of maintaining an electric welding arc as claimed in claim 23 wherein a fall of said arc voltage below said predetermined value indicates a shortening of said arc, and wherein the supply of welding power to said arc along said second, and greater-magnitude power volt-ampere curve halts shortening of said arc, and thereby keeps said arc voltage from reaching short circuit level.

25. A method of continuously maintaining an electric welding arc while forming globules of welding metal and transferring said globules of welding metal to a weld puddle on a work piece at low voltage levels a multiple number of times per second which comprises connecting a passive conductive member in series with said arc and with a source of welding power to supply a predetermined magnitude of welding power to said arc to supply heat to the tip of a welding electrode and thereby prepare said tip of said welding electrode for transformation into a globule of welding metal, sensing when the arc voltage falls below a predetermined value, and thereafter immediately connecting a further passive conductive member in series with said arc and with said source of welding power to enable the first said and said second passive conducting members to simultaneously supply welding power up to a greater predetermined magnitude of welding power to said arc and thereby complete the transformation of said tip of said welding electrode into a globule of welding metal and transfer said globule of welding metal to said weld puddle.

26. The method of maintaining an electric welding arc as claimed in claim 25 wherein said source of power is a D.C. source of power which can simultaneously supply welding power to a plurality of electric arc welders, and wherein the supplying of said welding power up to said predetermined magnitude of welding power is done at predetermined voltages which are well below open-circuit levels but well above the short circuit level, and wherein the subsequent supplying of said welding power up to said greater predetermined magnitude of welding power is done at levels below said predetermined voltages but above the short circuit level and thereby continuously maintains said arc through the welding operation.

27. A volt-ampere control for an electric arc welder that is connectable to a source of D.C. power and to a welding electrode and to a work piece and that comprises a resistor which is selectively connected in series relation with said welding electrode and said work piece but essentially in parallel relation with a grid ballast assembly that is connected to said source of D.C. power and to said welding electrode and said work piece, said grid ballast assembly being adapted and dimensioned to maintain a continuous arc between said welding electrode and said work piece, a sensing circuit which can sense the voltage across said arc and which develops a predetermined signal whenever said voltage across said arc falls below a predetermined value and a control circuit that can permit said grid ballast assembly to supply welding power to said arc along said first predetermined volt-ampere curve whenever said voltage across said arc is at or above said predetermined value, said control circuit responding to said predetermined signal from said sensing circuit to cause said resistor of said volt-ampere control to coact with said grid ballast assembly to supply welding power to said arc along a second and distinctly-different predetermined volt-ampere curve whenever said voltage across said arc is below said predetermined value, said first predetermined volt-ampere curve having a corresponding power curve of a predetermined magnitude, said second and distinctly-different predetermined volt-ampere curve having a corresponding power curve of a greater predetermined magnitude, whereby the amount of welding power which can be supplied to said arc is greater when said grid ballast assembly and said resistor of said volt-ampere control are simultaneously supplying welding power to said arc along said second and distinctly-different predetermined volt-ampere curve than when said volt-ampere control is supplying welding power to said arc along said first predetermined volt-ampere curve, and said control circuit causing said current-conducting means to shift from the supplying of welding power along said first predetermined volt-ampere curve to the supplying of welding power along said second and distinctly-different predetermined volt-ampere curve so rapidly that the shift is from a point on said first predetermined volt-ampere curve to a point of substantially equal potential but very substantially larger current on said second and distinctly-different predetermined volt-ampere curve.

28. An electric arc welder that is connectable to a source of power and to a welding electrode and to a work piece and that comprises a passive current-conducting means which supplies all of the welding power to an arc between said welding electrode and said work piece whenever said electric arc welder is supplying welding power to said arc when the arc voltage is at or above a predetermined value, a second passive current-conducting means which supplies at least some of the welding power to an arc between said welding electrode and said work piece whenever said electric arc welder is supplying welding power to said arc when said arc voltage is below said predetermined value, and a sensing circuit which senses said arc voltage and causes the first said passive current-conducting means to supply all of said welding current to said arc whenever said arc voltage is at or above said predetermined value, said sensing circuit causing said second passive current-conducting means to supply at least some of said welding current to said arc whenever said arc voltage is below said predetermined value, whereby the supplying of welding current to said arc by said second passive current-conducting means is a function of said arc voltage, said first said passive current-conducting means being selectively connectable in series with said arc and said source of power to supply welding power to said arc, said second passive current-conducting means being selectively connectable in series with said arc and said source of power but in essentially-parallel relation with said first said passive current-conducting means while said first said passive current-conducting means is connected in series with said arc and said source of power to supply greater values of welding power of momentary duration to said arc whenever said arc voltage falls below said predetermined value, said first said passive current-conducting means providing a generally constant arc voltage whenever said first said passive current-conducting means is supplying all of said welding power to said arc, but also providing zero-going voltage spikes in response to decreases in the resistance of said arc, said sensing circuit responding to zero-going voltage spikes which pass below said predetermined value to cause said second passive current-conducting means to coact with said first said passive current-conducting means to supply welding power to said arc, said first said passive current-conducting means and said second passive current-conducting means coacting to supply substantial amounts of welding power of momentary duration to said arc during said zero-going voltage spikes at voltages below said predetermined value when said second passive current-conducting means supplies any of said welding power to said arc.

* * * * *